(12) United States Patent
Monsheimer et al.

(10) Patent No.: US 8,449,809 B2
(45) Date of Patent: May 28, 2013

(54) POLYMER POWDER COMPRISING POLYAMIDE USE THEREOF IN A MOULDING METHOD AND MOULDED BODY MADE FROM SAID POLYMER POWDER

(75) Inventors: Sylvia Monsheimer, Haltern am See (DE); Franz-Erich Baumann, Duelmen (DE); Maik Grebe, Bochum (DE); Joerg Lohmar, Dortmund (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 13/281,000

(22) Filed: Oct. 25, 2011

(65) Prior Publication Data

US 2012/0041132 A1 Feb. 16, 2012

Related U.S. Application Data

(62) Division of application No. 11/587,795, filed as application No. PCT/EP2005/050948 on Mar. 3, 2005, now Pat. No. 8,066,933.

(30) Foreign Application Priority Data

Apr. 27, 2004 (DE) .......................... 10 2004 020 453

(51) Int. Cl.
*H05B 6/00* (2006.01)
(52) U.S. Cl.
USPC ........... 264/497; 264/460; 264/463; 524/538; 528/335
(58) Field of Classification Search
USPC ............ 264/460, 463, 497; 524/538; 528/335
See application file for complete search history.

(56) References Cited

U.S. PATENT DOCUMENTS

| | | | | |
|---|---|---|---|---|
| 4,065,519 A | * | 12/1977 | Koch | 264/126 |
| 4,334,056 A | * | 6/1982 | Meyer et al. | 528/496 |
| 5,132,394 A | * | 7/1992 | Bockrath | 528/353 |
| 5,425,817 A | | 6/1995 | Mugge et al. | |
| 5,733,497 A | * | 3/1998 | McAlea et al. | 264/497 |
| 5,876,647 A | * | 3/1999 | Makise et al. | 264/105 |
| 6,136,948 A | * | 10/2000 | Dickens et al. | 528/323 |
| 6,162,385 A | * | 12/2000 | Grosse-Puppendahl et al. | 264/250 |
| 6,243,616 B1 | * | 6/2001 | Droscher et al. | 700/118 |
| 6,355,358 B1 | | 3/2002 | Boer et al. | |
| 6,399,708 B2 | | 6/2002 | Valligny et al. | |
| 6,884,485 B2 | | 4/2005 | Baumann et al. | |
| 6,932,935 B1 | | 8/2005 | Oberhofer et al. | |
| 7,122,233 B2 | | 10/2006 | Montanari et al. | |
| 7,135,525 B2 | | 11/2006 | Petter et al. | |
| 7,211,615 B2 | | 5/2007 | Baumann et al. | |
| 7,459,115 B2 | * | 12/2008 | Stadler et al. | 264/261 |
| 7,795,339 B2 | | 9/2010 | Monsheimer et al. | |
| 7,906,063 B2 | | 3/2011 | Monsheimer et al. | |
| 8,066,933 B2 | | 11/2011 | Monsheimer et al. | |
| 8,119,715 B2 | | 2/2012 | Monsheimer et al. | |
| 8,173,258 B2 | | 5/2012 | Monsheimer et al. | |
| 2004/0068071 A1 | * | 4/2004 | Hoff et al. | 526/319 |
| 2004/0102539 A1 | | 5/2004 | Monsheimer et al. | |
| 2004/0106691 A1 | | 6/2004 | Monsheimer et al. | |
| 2004/0137228 A1 | | 7/2004 | Monsheimer et al. | |
| 2004/0138363 A1 | * | 7/2004 | Baumann et al. | 524/413 |
| 2004/0180980 A1 | | 9/2004 | Petter et al. | |
| 2004/0232583 A1 | | 11/2004 | Monsheimer et al. | |
| 2004/0265527 A1 | * | 12/2004 | Schmitz et al. | 428/36.91 |
| 2005/0014842 A1 | | 1/2005 | Baumann et al. | |
| 2005/0017398 A1 | * | 1/2005 | Van Ruiten et al. | 264/173.19 |
| 2005/0027047 A1 | | 2/2005 | Monsheimer et al. | |
| 2005/0027050 A1 | | 2/2005 | Monsheimer et al. | |
| 2005/0038201 A1 | | 2/2005 | Wursche et al. | |
| 2006/0071359 A1 | | 4/2006 | Monsheimer et al. | |
| 2006/0134419 A1 | | 6/2006 | Monsheimer et al. | |
| 2006/0182916 A1 | | 8/2006 | Dowe et al. | |
| 2006/0183869 A1 | | 8/2006 | Dowe et al. | |
| 2006/0189784 A1 | | 8/2006 | Monsheimer et al. | |
| 2006/0202395 A1 | | 9/2006 | Monsheimer et al. | |
| 2006/0223928 A1 | | 10/2006 | Monsheimer et al. | |
| 2006/0244169 A1 | | 11/2006 | Monsheimer et al. | |
| 2006/0281873 A1 | | 12/2006 | Alting et al. | |
| 2007/0055044 A1 | | 3/2007 | Simon et al. | |
| 2007/0104971 A1 | | 5/2007 | Wursche et al. | |
| 2007/0166560 A1 | | 7/2007 | Wursche et al. | |
| 2007/0260014 A1 | | 11/2007 | Simon et al. | |
| 2008/0119632 A1 | | 5/2008 | Baumann et al. | |
| 2008/0166496 A1 | | 7/2008 | Monsheimer et al. | |
| 2008/0166529 A1 | | 7/2008 | Hager et al. | |
| 2008/0213552 A1 | | 9/2008 | Hager et al. | |
| 2008/0217821 A1 | | 9/2008 | Goring et al. | |
| 2008/0242782 A1 | | 10/2008 | Hager et al. | |
| 2008/0249237 A1 | | 10/2008 | Hager et al. | |
| 2009/0088508 A1 | | 4/2009 | Monsheimer et al. | |
| 2009/0236775 A1 | | 9/2009 | Monsheimer et al. | |
| 2011/0130515 A1 | | 6/2011 | Monsheimer et al. | |

FOREIGN PATENT DOCUMENTS

| | | |
|---|---|---|
| DE | 29 06 647 | 4/1980 |
| WO | WO 01/38061 | 5/2001 |
| WO | 03/006724 | 1/2003 |

OTHER PUBLICATIONS

U.S. Appl. No. 13/581,085, filed Aug. 24, 2012, Baumann, et al.

* cited by examiner

*Primary Examiner* — Christina Johnson
*Assistant Examiner* — Saeed Huda
(74) *Attorney, Agent, or Firm* — Oblon, Spivak, McClelland, Maier & Neustadt, L.L.P.

(57) ABSTRACT

A molding, produced by a layer-by-layer process in which regions of respective polymer pulverulent layers are selectively melted via introduction of electromagnetic energy, where the process employs a powder which comprises at least one homopolyamide prepared via polycondensation of diamines and dicarboxylic acids, wherein the homopolyamide has an enthalpy of fusion of at least 125 J/g and a recrystallization temperature of at least 148° C.

19 Claims, No Drawings

POLYMER POWDER COMPRISING POLYAMIDE USE THEREOF IN A MOULDING METHOD AND MOULDED BODY MADE FROM SAID POLYMER POWDER

The present application is a division of U.S. Ser. No. 11/587,795, filed on Aug. 2, 2007, which is a National Stage (371) of PCT/EP05/050948, filed on Mar. 3, 2005, which claims priority to DE 10 2004 020 453.5, filed on Apr. 27, 2004.

The rapid production of prototypes is a task often required in very recent times. Particularly suitable processes are those whose operation is based on pulverulent materials, and which produce the desired structures layer-by-layer via selective melting and hardening. Support structures for overhangs and undercuts can be omitted here, because the powder bed surrounding the molten regions provides adequate support. Nor is there any need for subsequent operations to remove supports. These processes are also suitable for short-run production.

The invention relates to a polymer powder based on an XY-type polyamide, preferably an XY-type polyamide prepared via polycondensation of diamines with dicarboxylic acids, to the use of this powder in shaping processes, and also to moldings produced via a layer-by-layer process which selectively melts regions of a pulverulent layer, using this powder. After cooling and hardening of the regions previously subjected to layer-by-layer melting, the molding can be removed from the powder bed.

By way of example, the selectivity of the layer-by-layer process may be achieved by way of susceptors, absorbers, inhibitors, or masks, or by way of focused introduction of energy, for example via a laser beam or by way of glass fibers. The introduction of energy is achieved by way of electromagnetic radiation.

Descriptions are given below of some processes which can produce inventive moldings from the inventive powder, but there is no intention to restrict the invention thereto.

One process with particularly good suitability for rapid prototyping purposes is selective laser sintering. This process selectively and briefly irradiates plastics powders in a chamber with a laser beam, the result being that the powder particles impacted by the laser beam melt. The molten particles coalesce and rapidly solidify again to give a solid mass. This process can produce three-dimensional bodies simply and rapidly via repeated irradiation of a succession of freshly applied layers.

The patent specifications U.S. Pat. No. 6,136,948 and WO 96/06881 (both DTM Corporation) give a detailed description of the laser-sintering (rapid prototyping) process for producing moldings from pulverulent polymers. A wide variety of polymers and copolymers is claimed for this application, e.g. polyacetate, polypropylene, poly-ethylene, ionomers, and polyamide.

Other processes with good suitability are the SIB process described in WO 01/38061, or a process described in EP 1 015 214. Both processes operate with full-surface infrared heating to melt the powder. The selectivity of melting is achieved in the first process via the application of an inhibitor, and in the second process via a mask. DE 103 11 438 describes another process. In this, the energy needed for the melting process is introduced via a microwave generator, and the selectivity is achieved via application of a susceptor.

For the rapid prototyping or rapid manufacturing processes (RP or RM processes) mentioned use may be made of pulverulent substrates, in particular polymers, preferably selected from polyester, polyvinyl chloride, polyacetal, polypropylene, polyethylene, polystyrene, polycarbonate, poly(N-methylmethacrylimides) (PMMI), polymethyl methacrylate (PMMA), ionomer, polyamide, or a mixture of these.

WO 95/11006 describes a polymer powder suitable for laser sintering and showing no overlap of the melting and recrystallization peak during determination of melting behavior via differential scanning calorimetry at a scanning rate of 10-20° C./min, and having a degree of crystallinity of 10-90%, likewise determined via DSC, and having a number-average molecular weight Mn of from 30 000 to 500 000 and an Mw/Mn quotient in the range from 1 to 5.

DE 197 47 309 describes the use of a nylon-12 powder with an elevated melting peak and an increased enthalpy of fusion, obtained via reprecipitation of a polyamide previously prepared via ring-opening and subsequent polycondensation of laurolactam. This is an X-type polyamide.

A disadvantage of processing by means of one of the shaping processes described above is that, in order to avoid what is known as curl, the temperature in the construction chamber has to be kept with maximum uniformity to a level just below the melting point of the polymeric material. Curl means distortion of the previously molten region, causing at least some protrusion from the plane of construction. Associated with this is the risk that when the next pulverulent layer is applied the protruding regions may be shifted or even entirely broken away. The consequence of this in relation to the process is that the overall construction space temperature has to be kept at a relatively high level. For sharp separation of the regions into which the electromagnetic energy has been introduced from those not intended for melting, maximum enthalpy of fusion is desirable, giving a sharp DSC (differential scanning calorimetry to DIN 53765) peak. Conduction of heat and radiation of heat from the molten region, which of course cannot be prevented, also brings about relatively severe deviation of the molding from the intended contours. Maximum enthalpy of fusion of the powder inhibits sintering of the powder bed onto the molten region.

It was therefore an object of the present invention to provide a polymer powder which permits the production of moldings with maximum surface quality and maximum dimensional accuracy. The process here is a layer-by-layer process in which regions of the respective pulverulent layer are selectively melted by means of electromagnetic energy and, after cooling, have become bonded to give the desired molding.

Surprisingly, it has been found, as claimed in the claims, that the use of specific polyamides can, via precipitative crystallization, prepare polymer powders from which it is possible, via a layer-by-layer process in which regions of the respective pulverulent layer are selectively melted, to produce moldings which have advantages in terms of surface quality and dimensional accuracy, while their processing properties and mechanical properties are as good as those obtained from a polymer powder of the prior art, for example as in DE 197 47 309.

The present invention therefore provides a polymer powder for processing in a layer-by-layer process in which regions of the respective layer are selectively melted, which comprises at least one XY-type polyamide prepared from the polycondensation of diamines and dicarboxylic acids, preferably an XY-type polyamide from the group of PA610, PA612, PA613, PA1010, PA1012, PA1212. It is particularly preferable to use an XY-type polyamide which is RA1010, PA1012, or PA1212. The inventive polymer powder has an enthalpy of fusion determined by means of DSC of at least 125 J/g and a recrystallization temperature of at least 148° C., preferably an enthalpy of fusion of at least 130 J/g and a recrystallization temperature of at least 150° C., and particularly preferably an enthalpy of fusion of at least 130 J/g and a recrystallization temperature of at least 155° C.

The present invention also provides moldings produced via a layer-by-layer process which selectively melts regions of the respective layer, which comprise at least one XY-type polyamide prepared from the poly-condensation of diamines and dicarboxylic acids, preferably an XY-type polyamide from the group of PA610, PA612, PA613, PA1010, PA1012, PA1212. The molding particularly preferably comprises an XY-type polyamide from the group of PA1010, PA1012, or PA1212.

An advantage of the inventive polymer powder is that moldings produced therefrom via a layer-by-layer process in which regions of the respective layer are selectively melted have better dimensional accuracy and better surface quality when compared with moldings composed of conventional polyamide powders.

The mechanical properties of moldings produced from the inventive powder are good and similar to those of the moldings produced from conventional powder. The processability of the inventive powder is also comparable with that of conventional polyamide powders.

The inventive polymer powder is described below, but there is no intention to restrict the invention to this description.

The inventive polymer powder for processing in a layer-by-layer process in which regions of the respective layer are selectively melted comprises at least XY polyamide. These are homopolymers having the general formula:

ISO 1874-1 regulates the nomenclature of polyamides. In particular, appendix A describes the definition and naming of aliphatic linear polyamides. XY-type poly-amides whose use is in accordance with the invention are obtained from poly-condensation of diamines with dicarboxylic acids. x is the number of carbon atoms in the diamine, and y is the number of carbon atoms in the dicarboxylic acid. The preferred powder comprises both diamines and dicarboxylic acids of aliphatic (linear) type. Examples of monomer units used here are diamines of the following group: butanediamine, hexamethylenediamine, decanediamine, 1,12-di-aminododecane. Examples of monomers for the dicarboxylic acids are adipic acid (hexanedioic acid, b=4), azelaic acid (nonanedioic acid, b=7), sebacic acid (decanedioic acid, b=8), dodecanedioic acid (b=10), brassylic acid (b=11), tetradecanedioic acid (b=14), pentadecanedioic acid (b=15), octadecanedioic acid (b=18).

By way of example, inventive powder is obtained via a process as in DE 29 06 647 B1 or via DE 197 08 146, but using an XY-type polyamide as starting material. The polyamide is dissolved in ethanol and is crystallized under certain conditions. If appropriate, the material is subjected to precautionary sieving and further classification or low-temperature milling. The person skilled in the art can readily establish the conditions via exploratory preliminary experiments.

Surprisingly, it has been found that the advantageous properties described in DE 197 47 309 for the polyamide powder, namely high enthalpy of fusion, can be established much more advantageously if use is made of an XY-type polyamide instead of the X type. The difference consists in the possibility of formation of hydrogen bonds. By way of example, in the case of a PA 66—an inventive XY-type polyamide—the carbon-amide groups of adjacent molecules are always opposite one another in such a way as to permit every functional group to form a hydrogen bond without deformation. In the case of PA 6, which is an example of an X-type polyamide, this is only possible via deformation of the molecules, requiring additional energy. The result of this is that the melting peak for PA 66 (about 260° C.) is at a markedly higher level than for PA 6 (about 220° C.), as also is the enthalpy of fusion.

Unlike in DE 197 47 309 A1, a high recrystallization temperature is also advantageous, because firstly it does not restrict processing latitude—other factors having greater influence—and secondly the result is material with markedly better recycling capability. If the recrystallization temperature is high, powder which has not been melted during a construction process can be reused in a more advantageous ratio with virgin material, without adversely affecting surface properties. The inventive polymer powder therefore has an enthalpy of fusion determined by means of DSC of at least 125 J/g and a recrystallization temperature of at least 148° C., preferably an enthalpy of fusion of at least 130 J/g and a recrystallization temperature of at least 150° C., and particularly preferably an enthalpy of fusion of at least 130 J/g and a recrystallization temperature of at least 155° C. The various parameters were determined by means of DSC (differential scanning calorimetry) to DIN 53765, or to AN-SAA 0663. The measurements were made using a Perkin Elmer DSC 7 with nitrogen as flushing gas and with a heating rate and cooling rate of 20 K/min. The range of measurement was from −90 to +250° C.

The solution viscosity to DIN 53727 of the inventive polyamide powders in 0.5% strength m-cresol solution is preferably from 1.4 to 2.1, particularly preferably from 1.5 to 1.9, and very particularly preferably from 1.6 to 1.7.

The inventive polymer powder preferably comprises XY-type polyamide powder with a median particle size of from 10 to 250 μm, preferably from 45 to 150 μm and particularly preferably from 50 to 125 μm.

The pellets used as starting material for processing to give inventive powders are marketed, by way of example, by Degussa, Marl, Germany (nylon-6,12, trade name Vestamid D series) or by EMS Chemie, Donat, Switzerland (Technyl D, nylon-6,10).

Inventive polymer powder may also comprise auxiliaries and/or filler and/or other organic or inorganic pigments. Examples of these auxiliaries may be powder-flow aids, e.g. precipitated and/or fumed silicas. Examples of precipitated silicas are marketed with the product name Aerosil with various specifications by Degussa AG. Inventive polymer powder preferably comprises less than 3% by weight, preferably from 0.001 to 2% by weight, and very particularly preferably from 0.05 to 1% by weight, of these auxiliaries, based on the entirety of the polymers present. By way of example, the fillers may be glass particles, metal particles, or ceramic particles, e.g. glass beads, steel shot, or granulated metal, or pigments of other materials, e.g. transition metal oxides. By way of example, the pigments may be titanium dioxide particles based on rutile or anatase, or carbon black particles.

The median particle size of the filler particles is preferably smaller than or approximately equal to that of the particles of the polyamides. The amount by which the median particle size $d_{50}$ of the fillers exceeds the median particle size $d_{50}$ of the polyamides is preferably not more than 20%, preferably not more than 15%, and very particularly preferably not more than 5%. A particular limitation on the particle size is the permissible overall height and, respectively, layer thickness in the rapid prototyping/rapid manufacturing system.

Inventive polymer powder preferably comprises less than 75% by weight, preferably from 0.001 to 70% by weight, particularly preferably from 0.05 to 50% by weight, and very particularly preferably from 0.5 to 25% by weight, of these fillers, based on the entirety of polyamides present.

If the stated maximum limits for auxiliaries and/or fillers are exceeded, depending on the filler or auxiliary used, the result can be marked impairment of the mechanical properties of the moldings produced using these polymer powders.

It is also possible to mix conventional polymer powders with inventive polymer powders. This method can produce polymer powders with a different combination of surface properties. The process for preparing these mixtures may be found in DE 34 41 708, for example.

To improve melt flow during the production of the moldings, use may be made of a flow promoter, such as metal soaps, preferably the alkali metal or alkaline earth metal salts of the underlying alkanemono-carboxylic acids or dimer acids, added to the precipitated polyamide powder. The metal soap particles may be incorporated into the polymer particles, or else mixtures of fine metal soap particles and polymer particles may be used.

The amounts used of the metal soaps are from 0.01 to 30% by weight, preferably from 0.5 to 15% by weight, based on the entirety of polyamides present in the powder. Preferred metal soaps used were the sodium or calcium salts of the underlying alkanemonocarboxylic acids or dimer acids. Examples of commercially available products are Licomont NaV 101 or Licomont CaV 102 from Clariant.

To improve processability, or for further modification of the polymer powder, inorganic pigments composed of other materials, e.g. transition metal oxides, stabilizers, e.g. phenols, in particular sterically hindered phenols, flow promoters and powder-flow aids, e.g. fumed silicas, or else filler particles may be added. The amount of these substances added to the polymers, based on the total weight of polymers in the polymer powder, preferably complies with the stated concentrations for fillers and/or auxiliaries for the inventive polymer powder.

The present invention also provides a process for the production of moldings via layer-by-layer processes in which regions are selectively melted and in which use is made of inventive polymer powders which comprise at least one XY-type polyamide prepared via poly-condensation of diamines and dicarboxylic acids, preferably an XY-type polyamide from the group of PA66, PA610, PA612, PA1010, PA1012, PA1212, PA613. The inventive moldings particularly preferably comprise an XY-type polyamide which is PA1010, RA1012 or PA1212. XY-type polyamides whose use is in accordance with the invention are obtained from polycondensation of diamines with dicarboxylic acids. x is the number of carbon atoms in the diamine, and y is the number of carbon atoms in the dicarboxylic acid. The preferred powder comprises both diamines and dicarboxylic acids of aliphatic (linear) type. Examples of monomer units used here are diamines of the following group: butane-diamine, hexamethylenediamine, decanediamine, 1,12-di-aminododecane. Examples of monomers for the dicarboxylic acids are adipic acid (hexanedioic acid, b=4), azelaic acid (nonanedioic acid, b=7), sebacic acid (decanedioic acid, b=8), dodecanedioic acid (b=10), brassylic acid (b=11), tetradecanedioic acid (b=14), pentadecanedioic acid (b=15), octadecanedioic acid (b=18).

The energy is introduced via electromagnetic radiation, and the selectivity is achieved, by way of example, via masks, application of inhibitors, of absorbers, or of susceptors, or else via focusing of the radiation. Once all of the layers have been cooled, the inventive molding can be removed.

The examples below of these processes serve for illustration, but there is no intention that the invention be restricted thereto.

Laser sintering processes are well-known and are based on the selective sintering of polymer particles, layers of polymer particles being exposed briefly to laser light, thus causing bonding between the polymer particles exposed to the laser light. Three-dimensional objects are produced by sequential sintering of layers of polymer particles. Details concerning the selective laser sintering process are found by way of example in the specifications U.S. Pat. No. 6,136,948 and WO 96/06881.

Other processes with good suitability are the SIB process described in WO 01/38061, or a process described in EP 1 015 214. Both processes operate with full-surface infrared heating to melt the powder. The selectivity of melting is achieved in the first process via the application of an inhibitor, and in the second process via a mask. DE 103 11 438 describes another process. In this, the energy needed for the melting process is introduced via a microwave generator, and the selectivity is achieved via application of a susceptor.

The inventive moldings produced via a layer-by-layer process in which regions are selectively melted comprise at least one XY-type polyamide prepared via polycondensation of diamines and dicarboxylic acids, preferably an XY-type polyamide from the group of PA66, PA610, PA612, PA613, PA1010, PA1012, PA1212. The inventive moldings particularly preferably comprise an XY-type polyamide which is PA1010, PA1012 or PA1212. XY-type polyamides whose use is in accordance with the invention are obtained from polycondensation of diamines with dicarboxylic acids. x is the number of carbon atoms in the diamine, and y is the number of carbon atoms in the dicarboxylic acid. The preferred powder comprises both diamines and dicarboxylic acids of aliphatic (linear) type. Examples of monomer units used here are diamines of the following group: butane-diamine, hexamethylenediamine, decanediamine, 1,12-di-aminododecane. Examples of monomers for the dicarboxylic acids are adipic acid (hexanedioic acid, b=4), azelaic acid (nonanedioic acid, b=7), sebacic acid (decanedioic acid, b=8), dodecanedioic acid (b=10), brassylic acid (b=11), tetradecanedioic acid (b=14), pentadecanedioic acid (b=15), octadecanedioic acid (b=18).

The moldings may also comprise fillers and/or auxiliaries, e.g. heat stabilizers, e.g. sterically hindered phenol derivatives. Examples of fillers may be glass particles, ceramic particles, or else metal particles, e.g. iron shot, or appropriate hollow beads. The inventive moldings preferably comprise glass particles, very particularly preferably glass beads. Inventive moldings preferably comprise less than 3% by weight, preferably from 0.001 to 2% by weight, and very particularly preferably from 0.05 to 1% by weight, of these auxiliaries, based on the entirety of polymers present. Inventive moldings likewise preferably comprise less than 75% by weight, preferably from 0.001 to 70% by weight, particularly preferably from 0.05 to 50% by weight, and very particularly preferably from 0.5 to 25% by weight, of these fillers, based on the entirety of polymers present.

The examples below are intended to describe the inventive polymer powder and its use, without restricting the invention to the examples.

The laser scattering values measured were obtained using a Malvern Mastersizer S, version 2.18.

EXAMPLE 1

Reprecipitation of Nylon-12 (PA 12) (Non-Inventive)

400 kg of unregulated PA 12 prepared by hydrolytic polymerization and having a relative solution viscosity of 1.62 and an end group content of 75 mmol/kg of COOH and 69 mmol/kg of NH$_2$ are heated to 145° C. with 2500 l of ethanol denatured with 2-butanone and 1% water content within a period of 5 hours in a 3 m$^3$ stirred tank (d=160 cm) and kept at this temperature for one hour with stirring (blade stirrer, d=80 cm, rotation rate=49 rpm). The jacket temperature is then reduced to 124° C., and the internal temperature is brought to 125° C. using a cooling rate of 25 K/h with the same stirrer rotation rate, while ethanol is continuously removed by distillation. From now on, using the same cooling rate, the jacket temperature is kept below the internal temperature by from 2 to 3 K. The internal temperature is brought to 117° C., at the same cooling rate, and then kept constant for 60 minutes. The internal temperature is then brought to 111° C., at a cooling rate of 40 K/h with further removal of material by distillation. At this temperature precipitation begins, detectable via heat generation. The distillation rate is increased to an extent that keeps the internal temperature at not above 111.3° C. After 25 minutes, the internal temperature falls, indicating the end of the precipitation process. The temperature of the suspension is brought to 45° C. via further removal of material by distillation and cooling by way of the jacket, and then the suspension is transferred to a paddle dryer. The ethanol is distilled off from the mixture at 70° C./400 mbar, and the residue is then further dried for 3 hours at 20 mbar/86° C.

This gives a precipitated PA 12 with a median grain diameter of 55 µm. The bulk density was 435 g/l.

A powder composed of PA 1012, PA1010, PA612, PA613 is prepared by a method similar to the procedure set out in example 1, or according to DE 197 08 146.

EXAMPLE 2

Single-Stage Reprecipitation of PA 1010 (Inventive)

As in example 1, 400 kg of a PA 1010 sample obtained via polycondensation of 1,10-decanediamine and sebacic acid and having the following properties were reprecipitated:

$\eta_{rel}$=1.84, [COOH]=62 mmol/kg, [NH$_2$]=55 mmol/kg.

The precipitation conditions were modified in the following way in comparison with example 1:

| Precipitation temperature: 120° C., precipitation time: 2 hours, stirrer rotation rate: 90 rpm | | | |
|---|---|---|---|
| Bulk density: | 417 g/l | | |
| Screen analysis: | <32 µm: | 6.0% | by weight |
| | <45 µm: | 8.5% | by weight |
| | <63 µm: | 23.5% | by weight |
| | <100 µm: | 96.1% | by weight |
| | <160 µm: | 99.7% | by weight |
| | <200 µm: | 99.9% | by weight |
| | <250 µm: | 100.0% | by weight |

EXAMPLE 3

Single-Stage Reprecipitation of PA 1012 (Inventive)

As in example 1, 400 kg of a PA 1012 sample obtained via polycondensation of 1,10-decanediamine and dodecanedioic acid and having the following properties were reprecipitated:

$\eta_{rel}$=1.76, [COOH]=46 mmol/kg, [NH$_2$]=65 mmol/kg.

The precipitation conditions were modified in the following way in comparison with example 1:

| Solution temperature: 155° C., precipitation temperature: 123° C., precipitation time: 40 minutes, stirrer rotation rate: 110 rpm | | | |
|---|---|---|---|
| Bulk density: | 510 g/l | | |
| Screen analysis: | <32 µm: | 0.2% | by weight |
| | <100 µm: | 44.0% | by weight |
| | <250 µm: | 99.8% | by weight |

EXAMPLE 4

Single-Stage Reprecipitation of PA 1012 (Inventive)

Example 3 is repeated with the following changes:

| Precipitation temperature: 125° C., precipitation time: 60 minutes | | | |
|---|---|---|---|
| Bulk density: | 480 g/l | | |
| Screen analysis: | <32 µm: | 0.1% | by weight |
| | <100 µm: | 72.8% | by weight |
| | <250 µm: | 99.7% | by weight |

EXAMPLE 5

Single-Stage Reprecipitation of PA 1012 (Inventive)

Example 4 is repeated with the following changes:

| Precipitation temperature: 128° C., precipitation time: 90 minutes | | | |
|---|---|---|---|
| Bulk density: | 320 g/l | | |
| Screen analysis: | <32 µm: | 0.5% | by weight |
| | <100 µm: | 98.5% | by weight |
| | <250 µm: | 99.6% | by weight |

EXAMPLE 6

Single-Stage Reprecipitation of PA 1212 (Inventive)

As in example 1, 400 kg of a PA 1212 sample obtained via polycondensation of 1,10-decanediamine and 1,12-dodecanedioic acid and having the following data were reprecipitated:

$\eta_{rel}$=1.80, [COOH]=3 mmol/kg, [NH$_2$]=107 mmol/kg.

The precipitation conditions were modified in the following way in comparison with example 1:

| Solution temperature: 155° C., precipitation temperature: 117° C., precipitation time: 60 minutes, stirrer rotation rate: 110 rpm | | | |
|---|---|---|---|
| Bulk density: | 450 g/l | | |
| Screen analysis: | <32 µm: | 0.5% | by weight |
| | <100 µm: | 54.0% | by weight |
| | <250 µm: | 99.7% | by weight |

EXAMPLE 7

Two-Stage Reprecipitation of PA1010 (Inventive)

400 kg of unregulated PA 1010 sample obtained via polycondensation of 1,10-decanediamine and sebacic acid—having the following properties: $\eta_{rel}$=1.84, [COOH]=62 mmol/kg, [NH$_2$]=55 mmol/kg—are heated to 155° C. with 2500 l of ethanol denatured with 2-butanone and 1% water content within a period of 5 hours in a 3 m³ stirred tank (d=160 cm) and kept at this temperature for one hour with stirring (blade stirrer, d=80 cm, rotation rate=90 rpm). The jacket temperature is then reduced to 135° C., and the internal temperature is brought to 138° C. using a cooling rate of 25 K/h with the same stirrer rotation rate, while ethanol is continuously removed by distillation. From now on, using the same cooling rate, the jacket temperature is kept below the internal temperature by from 2 to 3 K. The internal temperature is brought to 128° C., at the same cooling rate, and then kept constant for 60 minutes. The internal temperature is then brought to 120° C., at a cooling rate of 40 K/h with further removal of material by distillation. At this temperature precipitation begins, detectable via heat generation. The distillation rate is increased to an extent that keeps the internal temperature at not above 121.3° C. After 25 minutes, the internal temperature falls, indicating the end of the precipitation process. The internal temperature is kept at 120° C. for a further 35 minutes. The temperature of the suspension is brought to 75° C. via further removal of material by distillation and cooling by way of the jacket, and then the suspension is transferred to a paddle dryer. The ethanol is distilled off from the mixture at 70° C./400 mbar, and the residue is then further dried for 3 hours at 20 mbar/86° C.

| Bulk density: | 440 g/l | |
|---|---|---|
| Screen analysis: | <32 μm: | 4.2% by weight |
| | <63 μm: | 28.6% by weight |
| | <100 μm: | 86.1% by weight |
| | <160 μm: | 99.7% by weight |
| | <250 μm: | 100.0% by weight |

EXAMPLE 8

Two-Stage Reprecipitation of PA 1012 (Inventive)

As in example 7, 400 kg of a PA 1012 sample obtained via polycondensation of 1,10-decanediamine and dodecanedioic acid and having the following properties were reprecipitated:
$\eta_{rel}$=1.76, [COOH]=46 mmol/kg, [NH$_2$]=65 mmol/kg (as in Example 3).

The precipitation conditions were modified in the following way in comparison with example 7:

| Solution temperature: 155° C., nucleation temperature: 141° C., precipitation temperature: 123° C., precipitation time: 40 minutes, stirrer rotation rate: 110 rpm | | |
|---|---|---|
| Bulk density: | 530 g/l | |
| Screen analysis: | <32 μm: | 1.3% by weight |
| | <100 μm: | 34.1% by weight |
| | <250 μm: | 99.7% by weight |

EXAMPLE 9

Two-Stage Reprecipitation of PA 1012 (Inventive)

Example 7 is repeated with the following changes:

| Nucleation time: | 90 minutes | |
|---|---|---|
| Bulk density: | 530 g/l | |
| Screen analysis: | <32 μm: | 0.8% by weight |
| | <100 μm: | 32.2% by weight |
| | <250 μm: | 99.8% by weight |

EXAMPLE 10

Two-Stage Reprecipitation of PA 1012

Example 7 is repeated with the following changes:

| Nucleation time: | 120 minutes | |
|---|---|---|
| Bulk density: | 530 g/l | |
| Screen analysis: | <32 μm: | 0.3% by weight |
| | <100 μm: | 28.4% by weight |
| | <250 μm: | 99.8% by weight |

EXAMPLE 11

Two-Stage Reprecipitation of PA 1212 (Inventive)

As in example 7, 400 kg of a PA 1212 sample obtained via polycondensation of 1,10-decanediamine and 1,12-dodecanedioic acid and having the following properties were reprecipitated:
$\eta_{rel}$=1.80, [COOH]=3 mmol/kg, [NH$_2$]=107 mmol/kg.

The precipitation conditions were modified in the following way in comparison with example 1:

| Solution temperature: 155° C., nucleation temperature: 123° C., nucleation time: 60 min, precipitation temperature: 117° C., precipitation time: 60 minutes, stirrer rotation rate:110 rpm | | |
|---|---|---|
| Bulk density: | 480 g/l | |
| Screen analysis: | <32 μm: | 1.3% by weight |
| | <100 μm: | 56.6% by weight |
| | <250 μm: | 99.8% by weight |

EXAMPLE 12

Two-Stage Reprecipitation of PA 613 (Inventive)

Example 7 is repeated using a PA613 obtained via polycondensation of hexamethylenediamine and brassylic acid—solution viscosity $\eta_{rel}$=1.83, [COOH]=17 mmol/kg, [NH$_2$]=95 mmol/kg—with the following changes:

| Solution temperature: 152° C., nucleation temperature: 125° C., nucleation time: 45 minutes, precipitation temperature: 114° C., precipitation time: 120 minutes, stirrer rotation rate: 110 rpm | | | |
|---|---|---|---|
| Bulk density: | | 380 g/l | BET = 11.19 m²/g |
| Laser scattering: | D10: | 55 μm | |
| | D50: | 78 μm | |
| | D90: | 109 μm | |

EXAMPLE 13

Single-Stage Reprecipitation of PA 613 (Inventive)

Example 1 is repeated using a PA613 obtained via polycondensation of hexamethylenediamine and brassylic acid—solution viscosity $\eta_{rel}$=1.65, [COOH]=33 mmol/kg, [NH$_2$]=130 mmol/kg—with the following changes:

Solution temperature: 152° C., precipitation temperature: 119° C., precipitation time: 150 minutes, stirrer rotation rate: 110 rpm
Bulk density:           426 g/l       BET = 7.63 m$^2$/g
Laser scattering:   D10:   50 μm
                    D50:   89 μm
                    D90:  132 μm

| | Enthalpy of fusion [J/g] | Recrystallization temperature [° C.] |
|---|---|---|
| Non-inventive PA 12 from ex. 1 (precipitative crystallization) | 112 | 141 |
| Hydrolytically polymerized PA 12 (Vestamid from Degussa) Non-inventive | 71 | 141 |
| Hydrolytically polymerized PA 11 (Rilsan from ELF Atochem S.A.) Non-inventive | 87 | 157 |
| PA1012 prepared according to DE 29 06 647 B1 Inventive | 152 | 155 |
| PA613 prepared according to DE 29 06 647 B1 Inventive | 130 | 172 |
| PA1010 prepared according to DE 29 06 647 B1 Inventive | 146 | 165 |
| PA612 prepared according to DE 29 06 647 B1 Inventive | 131 | 185 |
| | 132 | 150 |

The examples very clearly show that the inventive polyamide powder has markedly higher enthalpy of fusion and also higher recrystallization temperature than conventional polymer powders. Components with higher surface quality can therefore be produced, because less powder adheres to the molten regions. The recycling capability of the inventive powder is therefore likewise improved in comparison with conventional polyamide powders.

What we claim is:

1. A molding, produced by a layer-by-layer process in which regions of respective polymer pulverulent layers are selectively melted via introduction of electromagnetic energy, which comprises employing a powder which comprises at least one homopolyamide prepared via polycondensation of diamines and dicarboxylic acids, wherein the homopolyamide has an enthalpy of fusion of at least 125 J/g and a recrystallization temperature of at least 148° C.

2. The molding as claimed in claim 1, which comprises at least one homopolyamide prepared via polycondensation of a diamine from the group of butanediamine, hexamethylenediamine, decane-diamine, 1,12-diaminododecane, and of a dicarboxylic acid from the group of adipic acid, azelaic acid, sebacic acid, dodecanedioic acid, brassylic acid, tetradecanedioic acid, pentadecanedioic acid, octadecanedioic acid.

3. The molding as claimed in claim 1, which comprises at least one homopolyamide prepared via polycondensation of decanediamine and sebacic acid (PA1010).

4. The molding as claimed in claim 1, which comprises at least one homopolyamide prepared via polycondensation of decanediamine and dodecanedioic acid (PA1012).

5. The molding as claimed in claim 1, which comprises at least one homopolyamide prepared via polycondensation of hexamethylenediamine and dodecanedioic acid (PA612).

6. The molding as claimed in claim 1, which comprises at least one homopolyamide prepared via polycondensation of hexamethylenediamine and sebacic acid (PA610).

7. The molding as claimed in claim 1, which comprises at least one homopolyamide prepared via polycondensation of 1,12-diaminododecane and dodecanedioic acid (PA1212).

8. The molding as claimed in claim 1, which comprises at least one homopolyamide prepared via polycondensation of hexamethylenediamine and brassylic acid (PA613).

9. The molding as claimed in claim 1, which comprises polyamide powder which has been obtained via precipitative crystallization.

10. The molding as claimed in claim 1, which comprises a homopolyamide with a solution viscosity of from 1.4 to 2.1.

11. The molding as claimed in claim 1, which comprises a homopolyamide with a solution viscosity of from 1.5 to 1.9.

12. The molding as claimed in claim 1, which comprises a homopolyamide with a solution viscosity of from 1.6 to 1.7.

13. The molding as claimed in claim 1, which comprises auxiliaries and/or fillers.

14. The molding as claimed in claim 1, which comprises powder-flow aids as an auxiliary.

15. The molding as claimed in claim 1, which comprises glass particles as filler.

16. The molding as claimed in claim 1, which comprises metal soaps as an auxiliary.

17. The molding as claimed in claim 1, which comprises organic and/or inorganic pigments.

18. The molding as claimed in claim 1, which comprises carbon black.

19. The molding as claimed in claim 1, which comprises titanium dioxide.

* * * * *